US010302736B2

(12) United States Patent
Sutter et al.

(10) Patent No.: US 10,302,736 B2
(45) Date of Patent: May 28, 2019

(54) MOVING OBJECT DETECTION SYSTEM WITH DIRECTION AND DISTANCE PREDICTION

(71) Applicant: Avangrid Renewables, LLC, Portland, OR (US)

(72) Inventors: Christine Sutter, Gainesville, FL (US); Chuck Grandgent, Gainesville, FL (US); Amy Parsons, Portland, OR (US); Sara Parsons, Portland, OR (US); Stuart Webster, Portland, OR (US)

( * ) Notice: Subject to any disclaimer, the term of this patent is extended or adjusted under 35 U.S.C. 154(b) by 611 days.

(21) Appl. No.: 14/942,565

(22) Filed: Nov. 16, 2015

(65) Prior Publication Data

US 2016/0139240 A1     May 19, 2016

Related U.S. Application Data

(60) Provisional application No. 62/079,832, filed on Nov. 14, 2014.

(51) Int. Cl.
*H04W 4/029* (2018.01)
*G01S 5/02* (2010.01)
*H04W 4/02* (2018.01)

(52) U.S. Cl.
CPC ............ *G01S 5/0284* (2013.01); *G01S 5/021* (2013.01); *G01S 5/0221* (2013.01); *G01S 5/0294* (2013.01); *H04W 4/028* (2013.01); *H04W 4/029* (2018.02); *H04W 4/023* (2013.01)

(58) Field of Classification Search
CPC ...... G01S 5/0284; G01S 5/021; G01S 5/0221; G01S 5/0294; H04W 4/029; H04W 4/028; H04W 4/023

USPC .......................................................... 342/465
See application file for complete search history.

(56) References Cited

U.S. PATENT DOCUMENTS

| 3,053,480 | A | * | 9/1962 | Vanderlip | B64C 27/54 244/17.13 |
| 3,116,040 | A | * | 12/1963 | Thracy | B64C 27/18 244/17.13 |
| 9,644,608 | B2 | * | 5/2017 | Blom | F03D 7/0268 |
| 2001/0030625 | A1 | * | 10/2001 | Doles | G01S 5/02 342/387 |
| 2004/0148978 | A1 | * | 8/2004 | Kim | D06F 37/266 68/23 A |
| 2010/0076614 | A1 | * | 3/2010 | Nies | F03D 17/00 700/287 |

(Continued)

FOREIGN PATENT DOCUMENTS

| EP | 2667023 A2 * | 11/2013 | ............. F03D 7/048 |
| WO | WO-2014173417 A1 * | 10/2014 | ............ F03D 7/0224 |

*Primary Examiner* — Vladimir Magloire
*Assistant Examiner* — Nuzhat Pervin
(74) *Attorney, Agent, or Firm* — Klarquist Sparkman, LLP

(57) ABSTRACT

In one representative embodiment, a method of detecting position relative to a wind turbine can comprise detecting a condor within a detection area, determining a first position of the condor relative to the wind turbine, assigning the condor to a first predetermined zone of a plurality of predetermined zones based on the first position, determining a second position of the condor relative to the wind turbine, assigning the condor to a second predetermined zone of the plurality of predetermined zones based on the second position, predicting a trajectory of the condor based on a relationship between the first position and the second position.

29 Claims, 9 Drawing Sheets

(56) References Cited

U.S. PATENT DOCUMENTS

| | | | |
|---|---|---|---|
| 2011/0241928 A1* | 10/2011 | Oswald | G01S 13/42 342/90 |
| 2012/0029824 A1* | 2/2012 | Wilson | G01W 1/10 702/3 |
| 2013/0098309 A1* | 4/2013 | Nohara | A01M 29/06 119/713 |
| 2013/0161956 A1* | 6/2013 | Evans | F03D 7/042 290/44 |
| 2014/0144390 A1* | 5/2014 | Duncan | A01M 29/18 119/713 |
| 2014/0148978 A1* | 5/2014 | Duncan | A01M 29/10 701/3 |
| 2014/0178195 A1* | 6/2014 | Blom | F03D 7/0268 416/1 |
| 2014/0313345 A1* | 10/2014 | Conard | G06K 9/00664 348/169 |
| 2014/0327569 A1* | 11/2014 | Fun | G01S 13/951 342/26 D |
| 2015/0159632 A1* | 6/2015 | Vangen | F03D 17/00 416/61 |
| 2015/0322924 A1* | 11/2015 | Menasanch de Tobaruela | F03D 1/06 73/660 |
| 2015/0379408 A1* | 12/2015 | Kapoor | G01W 1/10 706/46 |
| 2016/0032890 A1* | 2/2016 | Hammerum | F03D 7/0224 416/1 |

* cited by examiner

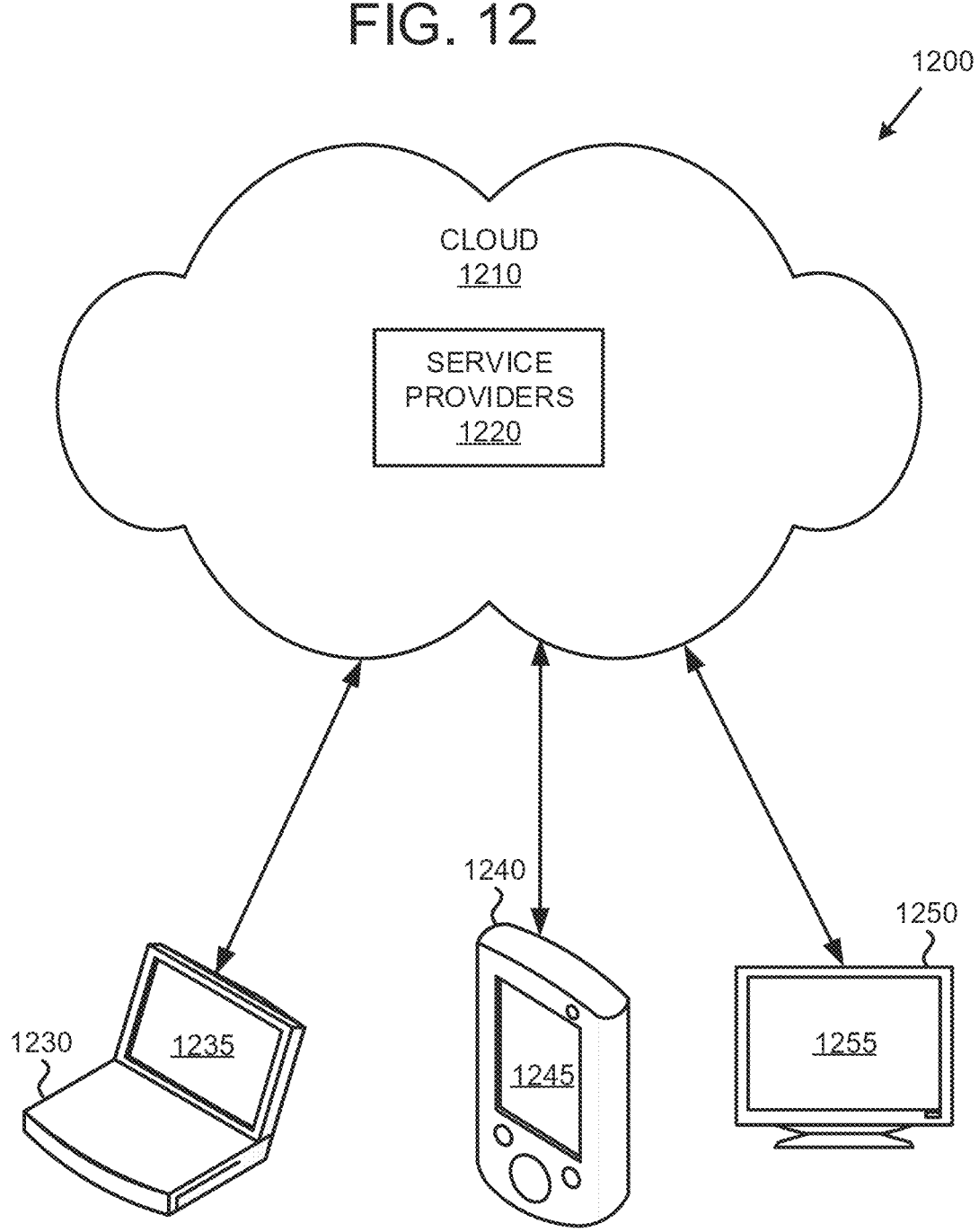

MOVING OBJECT DETECTION SYSTEM WITH DIRECTION AND DISTANCE PREDICTION

CROSS REFERENCE TO RELATED APPLICATION

This application claims the benefit of U.S. Provisional Patent Application No. 62/079,832, filed Nov. 14, 2014, which is hereby incorporated by reference.

BACKGROUND

This application relates to the detection of moving objects, and in particular, to the detection of condors (as well as other bird species and other organisms).

A conventional system for detecting condors is used to detect the presence of condors as they approach a wind turbine operating area. A substantial fraction of condors are fitted with VHF transmitter tags. The conventional system can detect a tagged condor that enters the operating range of the system. Under the conventional approach, the detection of a tagged condor is communicated to human observers to supplement their condor detection efforts with the naked eye and handheld VHF scanning equipment. According to an established rule set, the human observers instruct the facility to shut down the wind turbines when a condor approaches within a predetermined distance. One example of the conventional system and methods is known as the ReCON™ system being tested at the Manzana Wind facility and in operation at the Alta East Wind Project, both located in Kern County, Calif.

Given the importance of preventing harm to condors, it would be beneficial to improve the conventional detection systems and methods to increase accuracy, decrease reliance on human observation and improve communication and efficiency in detecting condor risk and taking appropriate risk reduction measures.

SUMMARY

Described herein are examples of systems, apparatus, and methods that can be used to detect the position of an object. In some embodiments, these systems, apparatus, and methods can be used to detect the position of a moving object or organism relative to operating equipment.

In one representative embodiment, a method of detecting position relative to a wind turbine can comprise detecting a condor within a detection area, determining a first position of the condor relative to the wind turbine, assigning the condor to a first predetermined zone of a plurality of predetermined zones based on the first position, determining a second position of the condor relative to the wind turbine, assigning the condor to a second predetermined zone of the plurality of predetermined zones based on the second position, predicting a trajectory of the condor based on a relationship between the first position and the second position.

In some embodiments, the method can further comprise predicting a third position of the condor based on the trajectory of the condor, and assigning the condor to a third predetermined zone of the plurality of predetermined zones based on the third position. In some embodiments, the method can further comprise setting an alert status for each of the first and the second zones, and transmitting a communication for each of the alert statuses. In some embodiments, the method can further comprise activating a tracking receiver configured to track the positioning of the object based on the second predetermined zone of the plurality of predetermined zones, wherein the second predetermined zone is within an action radius.

In some embodiments, detecting the object can comprise scanning the area at a first interval, and the method can further comprise setting a second interval, which is different than the first interval, based on the second predetermined zone of the plurality of predetermined zones. In some embodiments, the method can further comprise altering an operation of the wind turbine based on the predicted trajectory of the condor.

In some embodiments, the wind turbine is a first wind turbine, and the method can further comprise at least a second wind turbine, altering an operation of the first turbine based on the predicted trajectory of the condor, and continuing an operation of at least one other wind turbine based on the predicted trajectory of the condor.

In another representative embodiment, a method of detecting position relative to operating equipment at a site can comprise detecting a moving object within a detection area, determining a first position of the object relative to the equipment, assigning the object to a first predetermined zone of a plurality of predetermined zones based on the first position, determining a second position of the object relative to the equipment, assigning the object to a second predetermined zone of the plurality of predetermined zones based on the second position, and predicting a trajectory of the object based on a relationship between the first position and the second position.

In some embodiments, the method can further comprise setting an alert status for each of the first and the second zones, and transmitting a communication for each of the alert statuses to an observation team and to an equipment operator. In some embodiments, determining the first and second positions can comprise determining direction and distance.

In some embodiments, the detected moving object can be a drone. In some embodiments, the detected moving object can be a condor. In some embodiments, the detected moving object can emit a signal.

In another representative embodiment, a computer-readable storage including instructions thereon for detecting position relative to operating equipment at a site can comprise instructions for detecting an object within a detection area, instructions for determining a first position of the object relative to the equipment, instructions for assigning the object to a first predetermined zone of a plurality of predetermined zones based on the first position, instructions for determining a second position of the object relative to the equipment, instructions for assigning the object to a second predetermined zone of the plurality of predetermined zones based on the second position, and instructions for predicting a trajectory of the object based on a relationship between the first position and the second position.

In some embodiments, the computer readable storage can further comprise instructions for predicting a third position of the object based on the trajectory of the object, and instructions for assigning the object to a third predetermined zone of the plurality of predetermined zones based on the third position. In some embodiments, the computer readable storage can further comprise instructions for setting an alert status for each of the first and the second zones, and instructions for transmitting a communication for each of the alert statuses.

In some embodiments, the computer readable storage can further comprise instructions for activating a tracking receiver configured to track the positioning of the object based on the second predetermined zone of the plurality of predetermined zones, wherein the second predetermined zone is within an action radius. In some embodiments, the instructions for detecting the object can comprise instructions for scanning the area at a first interval, and the computer readable storage can further comprise instructions for setting a second interval, which is different than the first interval, based on the second predetermined zone of the plurality of predetermined zones.

In some embodiments, the computer readable storage can further comprise instructions for altering an operation of the equipment based on the predicted trajectory of the object. In some embodiments, the equipment can be a first piece of equipment in a group of equipment. In some embodiments, the computer readable storage can further comprise instructions for altering an operation of at least one piece of equipment based on the predicted trajectory of the object, and instructions for continuing an operation of at least one other piece of equipment based on the predicted trajectory of the object.

In another representative embodiments, a system for detecting position relative to operating equipment at a site can comprise at least one receiver configured for receiving signals from an object, at least one communication link configured to transmit and receive communications between the at least one receiver to a remote location, and the system including one or more processors configured to perform the following instructions: instructions for detecting the object within a detection area, instructions for determining a first position of the object relative to the equipment, instructions for determining a second position of the object relative to the equipment, and instructions for predicting a trajectory of the object based on a relationship between the first position and the second position.

In some embodiments, the one or more processors can be further configured to perform instructions for assigning the object to a first predetermined zone of a plurality of predetermined zones based on the first position, and instructions for assigning the object to a second predetermined zone of the plurality of predetermined zones based on the second position.

In some embodiments, the system can further comprise an additional receiver configured for tracking the positioning of the object. In some embodiments, the additional receiver can be a fourth receiver.

In some embodiments, the object can be a first object in a group of objects, the at least one receiver can be configured for receiving signals from more than one of the objects, and the one or more processors can be configured to perform the instructions for each object in the group of objects. In some embodiments, the system can further comprise a reference beacon. In some embodiments, the equipment can a wind turbine, and the moving object can be a condor. In some embodiments, the moving object can be a drone.

The foregoing and other objects, features, and advantages of the invention will become more apparent from the following detailed description, which proceeds with reference to the accompanying figures.

BRIEF DESCRIPTION OF THE DRAWINGS

FIG. 12 is an example cloud-support environment that can be used in conjunction with the technologies described herein.

DETAILED DESCRIPTION

According to a new system and methods, detection of moving objects (e.g., condors and/or other moving objects or organisms) is enhanced by providing information about direction, distance, and trajectory (or path) of any detected object or group of objects. In some implementations, there is a direct communication link to a party of interest, including, e.g., a site potentially implicated by the object's trajectory, such as a wind turbine operator or other operator of equipment on the site, allowing detection information to be conveyed more quickly and directly. In some implementations, there is a direct communication link to another system, including other detection/deterrent systems (e.g., audio and/or visual). In some implementations, communication of such enhanced detection information may reduce or eliminate the need for human observation.

By communicating direction, distance and trajectory information, in addition to solely presence information as in the conventional approach, any human observation efforts can be focused in the predicted direction, which promotes faster confirmation and subsequent action. In addition, having a distance value for the detected object allows for greater sensitivity in implementing risk reduction measures, such as controlling the turbines, including shutting down only certain turbines within a predetermined range of a detected condor's predicted trajectory. Trajectory information about the direction of travel allows for an assessment of the level of risk so that appropriate risk reduction measures can be implemented.

It has been determined that the VHF signal strength of a detected condor can be correlated to the condor's distance, direction and trajectory from the signal receiver, but the relationship is complex and not straightforward. Described below is an algorithm that accounts for various factors influencing signal strength, including, e.g., signal bounce due to the topography of the detection area, echoes and other factors. In some implementations, the signal strength is based on evaluating multiple antennas instead of a single antenna.

It should be noted that, although the systems, apparatus, and methods described herein are generally described with reference to condors and/or wind turbines, the systems, apparatus, and methods can be used with various other moving objects and/or operating equipment at a site. For example, in some embodiments, the positioning of a drone or other type of flying object can detected. In other embodiments, the positioning of organisms such as predatory and/or dangerous animals (e.g., wolves, cougars, sharks, etc.) can be detected. As such, the described systems, apparatus, and methods can provide improved safety for humans, livestock, other animals, etc.

Figure 8:
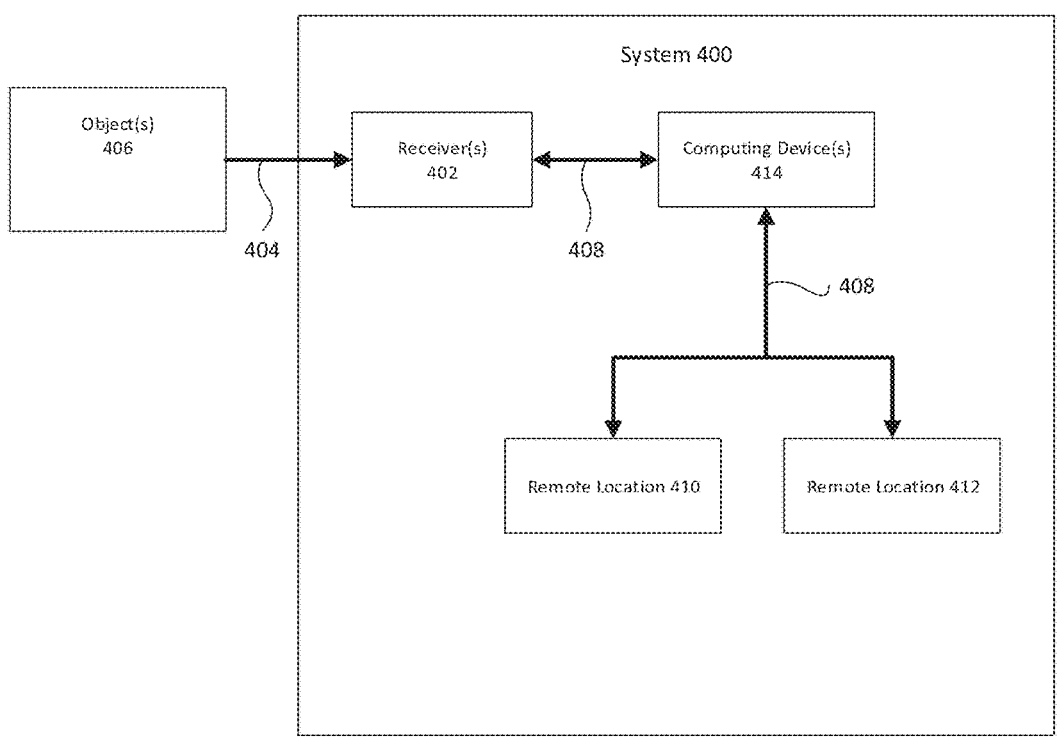
FIG. 8 shows an example of a system that can be used to detecting a position of an object.

Referring to FIG. 8, in a representative system 400, there can be at least one receiver 402 configured for receiving signals 404 from tagged or signal-emitting objects 406, such as condors with Very High Frequency (VHF) tags. VHF tags can be attached to various moving objects (e.g., animals) and can comprise a transmitter circuit that is configured to produce VHF radio signals and a power cell (e.g., battery). In some implementations, there are multiple receivers. The one or more receivers 402 can be configured to scan for and detect radio frequencies such as VHF tag frequencies (e.g., know frequencies of tagged condors). The receivers 402 can be disposed at a station comprising one or more antennas which can be mounted to a tower (e.g., a cell tower or met tower). In one particular embodiment, the station can comprise four directional antennas (e.g., one antenna for each of the four cardinal directions), three receivers, a computer, and a cellular modem, as well as supporting infrastructure configured to monitor system function components.

The system 400 can also comprise communication links 408 from the receivers to remote locations 410, 412, such as with an observation team, with a site operator, with a central operations control center, with another system, etc. The communications links 408 can be made using any suitable communication mode, such as by email, text or SMS message, voice, or other suitable mode.

In some embodiments, the system 400 can comprise one or more computing devices 414 having communication links 408 from the receivers 402 and/or the remote locations 410, 412.

Figure 9:
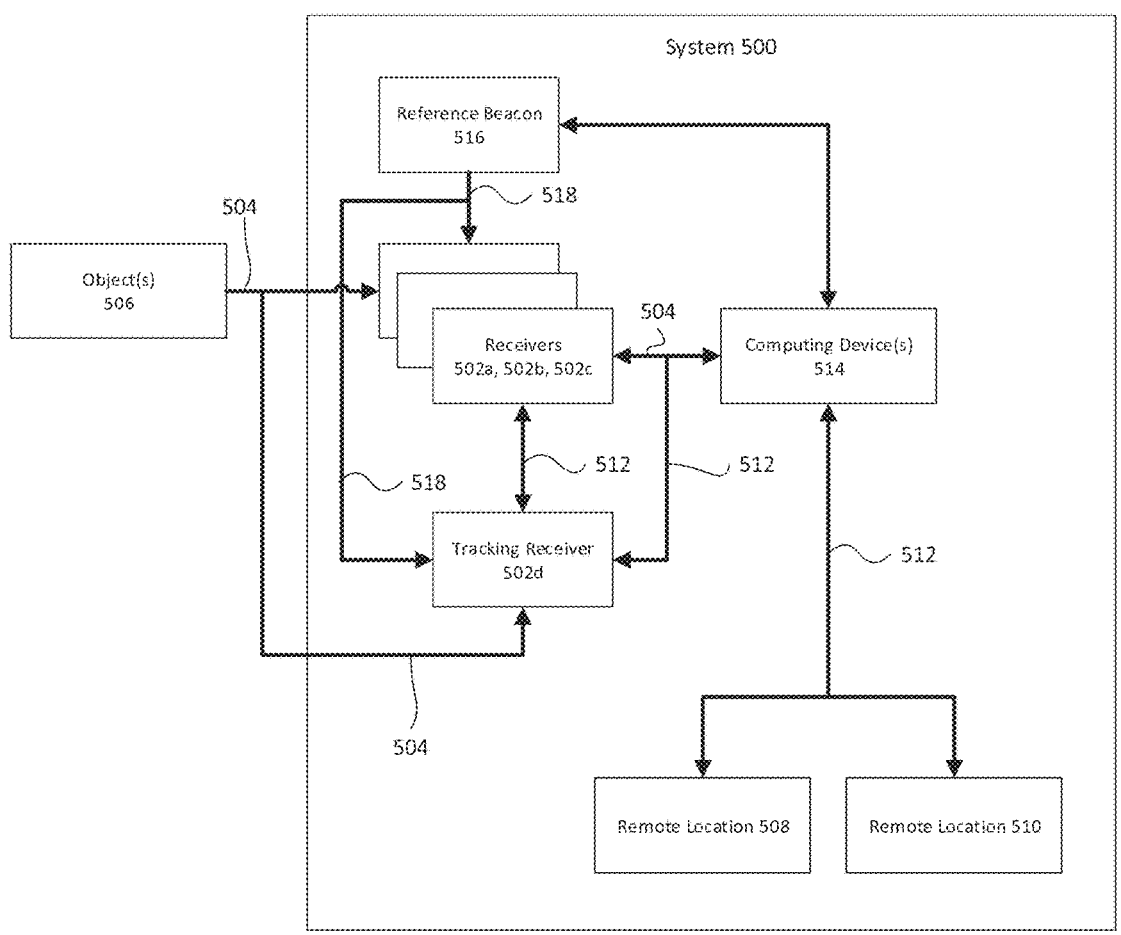
FIG. 9 shows an example of a system according to another embodiment that can be used to detecting a position of an object.

Referring to FIG. 9, there is shown a representative system 500. The system can comprise a plurality of receivers (four in the illustrated embodiment 502a, 502b, 502c, 502d), configured for receiving signals 504 from one or more tagged or signal-emitting objects 506 (e.g., tagged condors, drones, etc.). Each of the receivers (e.g., 502a, 502b, 502c, 502d) can be configured to transmit and/or receive communications from one or more remote locations (e.g., remote locations 508, 510) via communication links 512. In some embodiments, one of the receivers (e.g., 502d) (which can be called a tracking receiver) can be configured to track a detected object or objects. For example, the tracking receiver 502d can track a detected condor or group of condors that has entered a predetermined zone and allow enhanced observation of the detected condor.

In some embodiments, the system 500 can comprise one or more computing devices 514 having communication links 512 from the receivers 502a, 502b, 502c, 502d and/or the remote locations 508, 510.

In some embodiments, the system (e.g., the systems 400, 500) can comprise a reference beacon (which can be called a sentinel). The reference beacon can be configured to calibrate variability in signal strength of a signal-emitting object (e.g., a tagged condor, a drone, etc.) due to varying environmental conditions (e.g., weather/meterological changes) in the area. The reference beacon can provide a standard using a known signal strength at a known distance that the system uses as a basis to adjust signal strength levels with varying environmental conditions at the site. For example, the system 500 can have a reference beacon 516 which can emit signals 518 that can be received by the receivers 502a, 502b, 502c, 502d. The reference beacon 516 can also have a communication link with the computing device 514.

Figure 1:
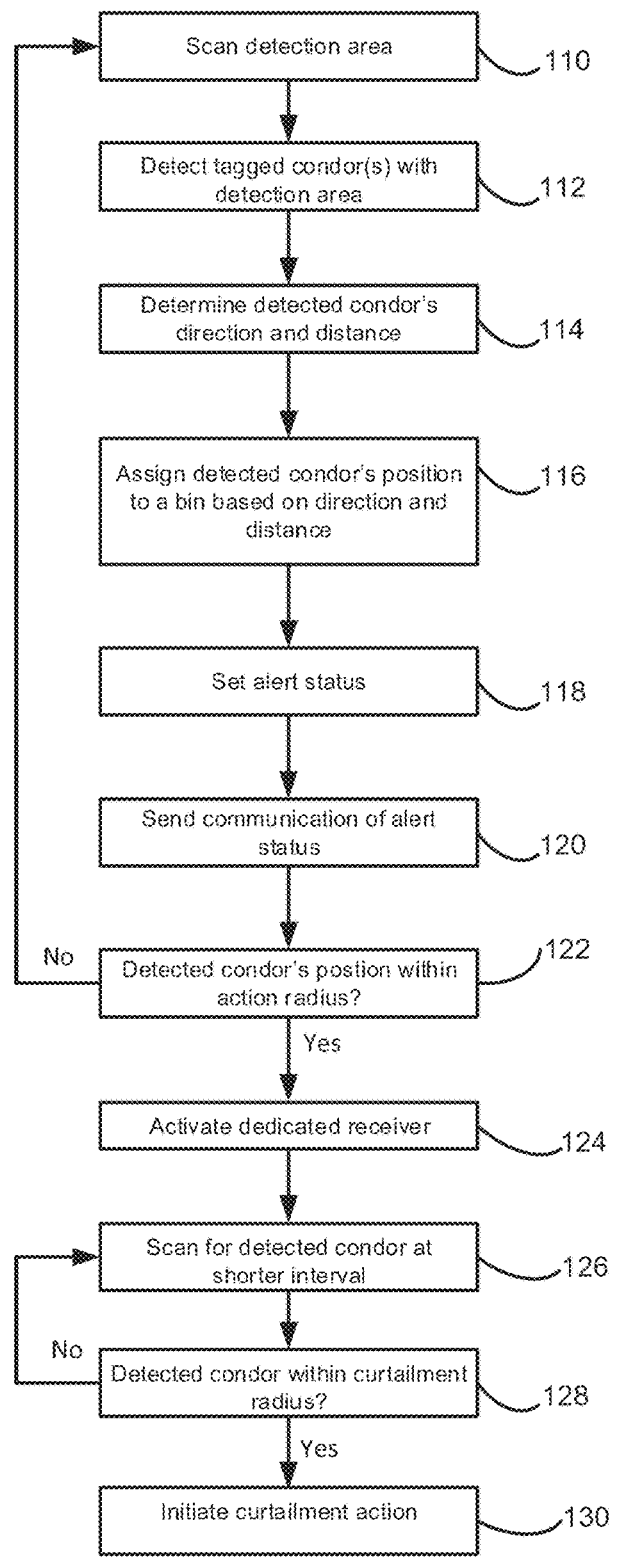
FIG. 1 is an example flow chart of a method for detecting a position of a moving object, e.g., a condor.

A flow chart of a representative method is shown in FIG. 1. In step 110, a predetermined detection area is scanned. In some implementations, the detection area is defined as having a 15-20 mile radius from the receivers, subject to variations due to, e.g., topography. In step 112, it is assumed that a tagged condor has been detected within the detection area because a known condor ID signal has been received. In some implementations, the scanning interval for all known ID signals is approximately every 2 minutes.

In step 114, the detected condor's direction and distance relative to the receivers are determined.

Figure 2:
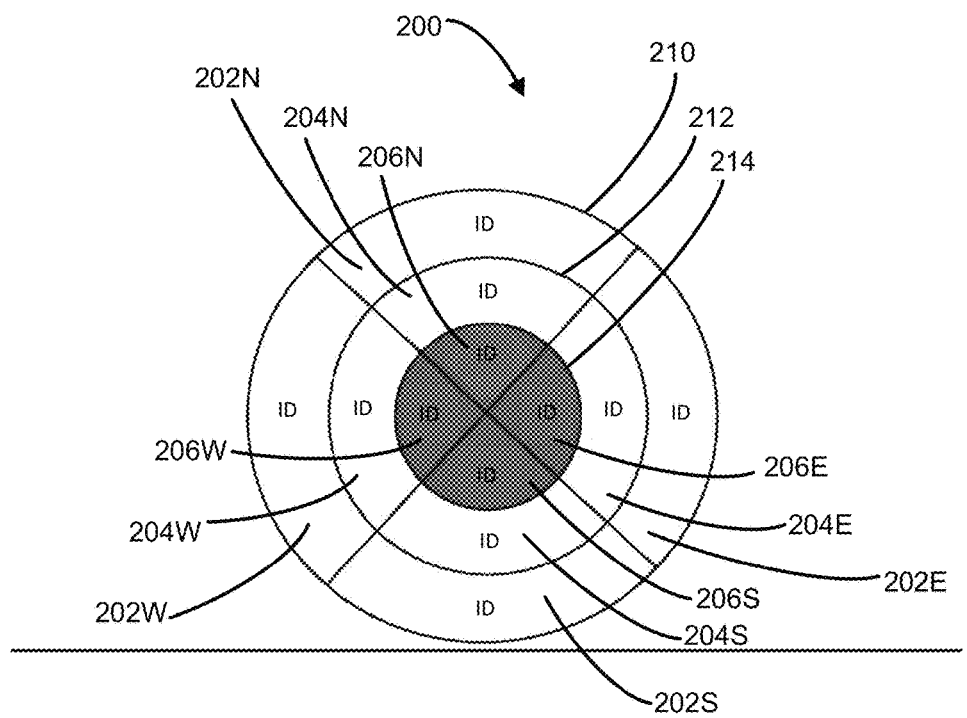
FIG. 2 is a schematic of an example site at which the moving object's position can be detected.

In step 116, the detected condor's position is assigned or categorized, e.g., by assigning it to a bin representing a distance and direction relative to the receivers. FIG. 2 is a drawing of a representative site 200 on which a detection area 210 is defined at a maximum detection radius from the receivers, which are located at the center of the detection area 210. The detection area has been divided into multiple zones or areas, which are called "bins" in this example. In this example, there are bins defined at each of the cardinal directions (North, East, South and West), and at three different distances from the center. Thus, the outermost areas are the bins 202N, 202E, 202S and 202W. The intermediate areas are the bins 204N, 204E, 204S and 204W. The innermost areas are the bins 206N, 206E, 206S and 206W. In other examples, fewer or greater areas could be defined.

The detected condor's predicted trajectory can be determined by tracking the bin to which its current position is assigned (current bin), as well as tracking at least one past position and the bin to which the past position is assigned (past bin). Based on these multiple data points of the current bin and at least one past bin, a next bin can be predicted, which provides predicted trajectory information. Thereafter, as each updated position of the detected condor is received, the updated position information is used to refine the predicted trajectory.

The bins 206N, 206E, 206S and 206W are defined to extend from the receivers to a first radius 214, which is also called a curtailment radius. As is explained below, a condor detected within the curtailment radius triggers the operator to shut down one or more wind turbines. The bins 204N, 204E, 204S and 204W are defined as the region lying outside the curtailment radius 214 and within a second radius 212, which is also called an action radius. For a condor detected within the action radius 212 but outside of the curtailment radius 214, an alert communication is sent to the observation team (and, optionally, the operator). The bins 202N, 202E, 202S and 202W are defined as lying outside the action radius but within the detection area 210. For a condor detected within the detection area 210 but outside of the action radius 212, a communication is still sent, but it can take the form of an information notice instead of an alert. In some implementations, the altitude of the condor or other moving object is taken into account.

In step 118, an alert status is set for the detected condor, and in step 120, a communication corresponding to the alert status is sent. The alert status can be set based on one or more predetermined factors, such as, e.g., distance, direction, time of day and other similar characteristics. In one implementation, the alert status is determined primarily by the detected condor's distance. For example, if the detected condor is in one of the bins 202N, 202E, 202S and 202W, then the alert status can be considered yellow, and an informational communication can be sent as described above. If the detected condor is within one of the bins 204N, 204E, 204S and 204W, then the alert status can be considered yellow, and an alert communication is sent. If the detected condor is within one of the bins 206N, 206E, 206S and 206W, then the alert status can be considered red, and a high alert communication is sent.

Figure 3:
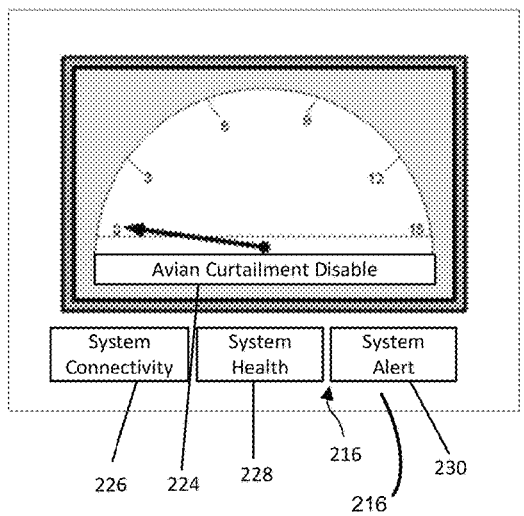
FIGS. 3-6 show examples of graphical user interfaces which can be used to display alerts and communications regarding the moving object's position.
Figure 4:
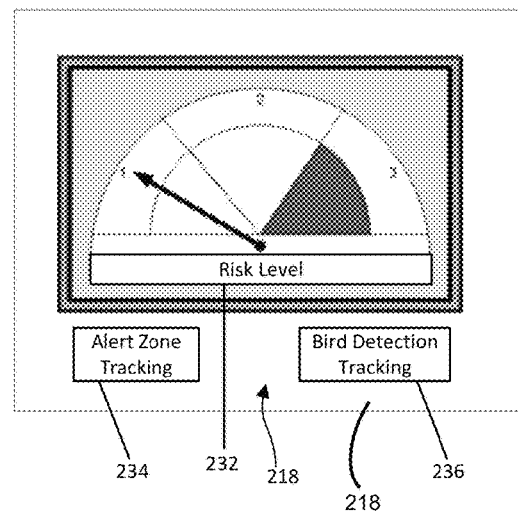
Figure 5:
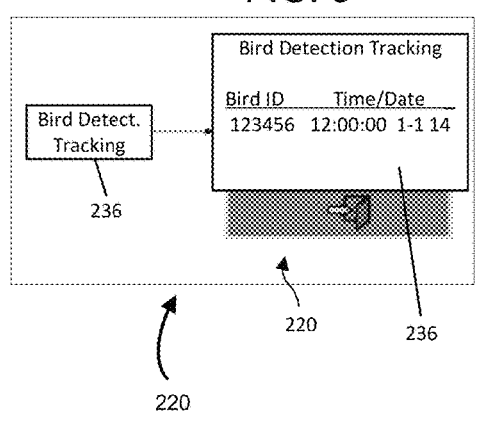
Figure 6:
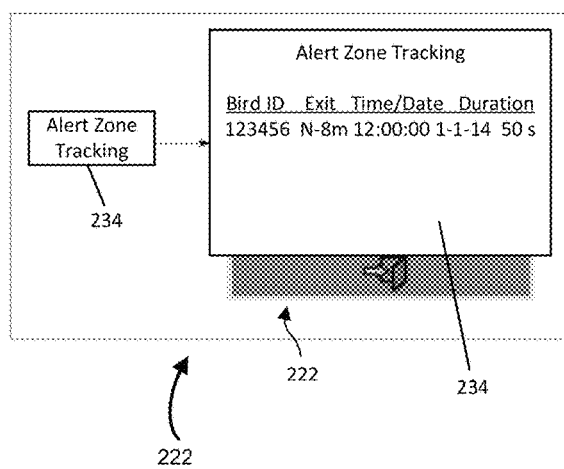

As best shown in FIGS. 3-6, one or more of the alerts and/or informational communications can be displayed on a graphical-user interface (GUI) 216, 218, 220, 222. The alerts and/or communications can be viewed by a user or users such as observation teams, equipment operators, etc. FIG. 3 shows the GUI 216 which can be configured to display, for example, a curtailment indicator 224, system connectivity 226, system health 228, and system alert 230. FIG. 4 shows the GUI 218 which can be configured to display, for example, risk level 232, alert zone tracking 234, and bird detection tracking 236. As shown in FIG. 5, the GUI 220 can be configured to display information corresponding to the bird detection tracking 236, such as a Bird ID number and/or a time stamp for each bird that is detected. As shown in FIG. 6, the GUI 222 can be configured to display information corresponding to the alert zone tracking 234, such as Bird ID number, Exit Bin, time stamp and duration.

In step 122, the system calculates whether the detected condor's position is within the action radius 212. If not, then the regular scanning process continues at a predetermined scanning interval. If so, then in step 124, an additional procedure is initiated and a dedicated receiver is activated to track the detected condor within the action radius 212. For example, as shown in step 126, the area within the action radius may be scanned at a shorter interval, e.g., every 30 seconds, or every 20 seconds, or even every 10 seconds. The length of the shorter scanning interval can be set according to whether the detected condor is a single condor or is a group of condors.

In step 128, the system calculates whether the detected condor is within the curtailment radius. If not, then the enhanced scanning for the detected condor is continued. If so, a high alert is set, and instructions to curtail operation of one or more wind turbines are sent to the operator, as indicated in step 130. In some implementations, at least one other wind turbine (e.g., a wind turbine determined not to be a risk) can continue operation.

Additional description of the above approaches as well as additional approaches are provided below. The specific steps shown in the flow chart of FIG. 1 relate to one representative approach chosen for expository convenience. Other similar approaches are possible and fall within the scope of this application.

Figure 7:
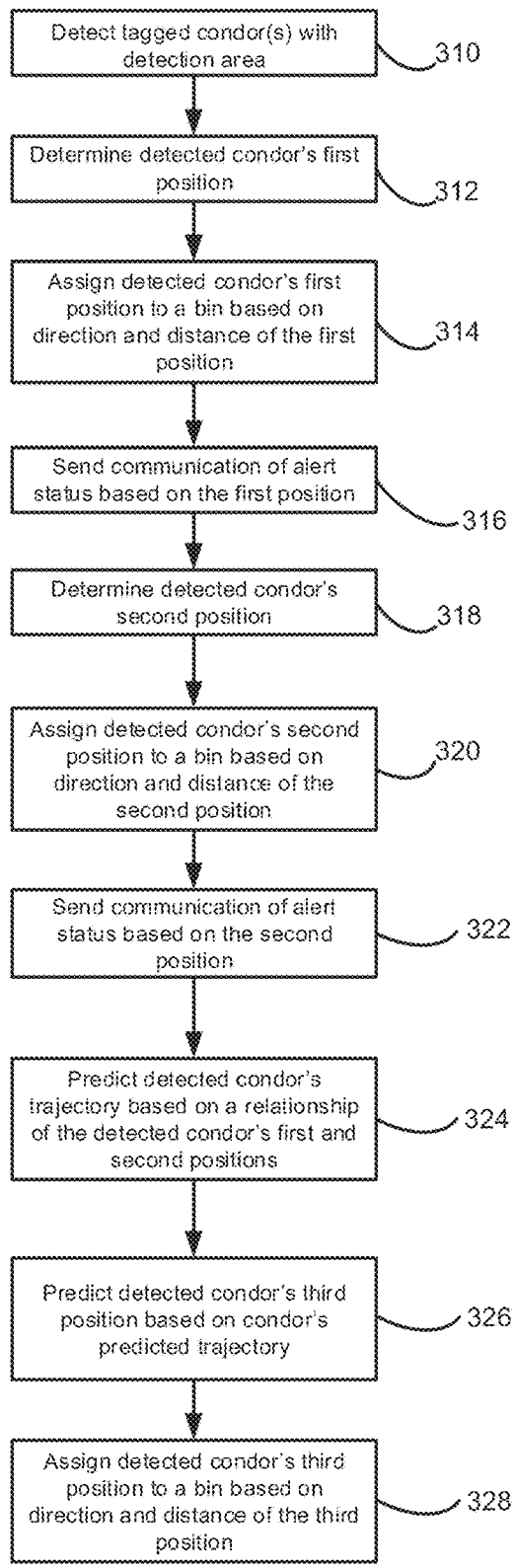
FIG. 7 is a flowchart of a method according to another embodiment for detecting a position of a moving object.

A flow chart of another representative method is shown in FIG. 7. In some embodiments, a method can comprise steps 310-328. In step 310, it is assumed that a tagged condor has been detected within the detection area because a known condor ID signal has been received. In step 312, the detected condor's position (which can be a first position) is detected based on direction and distance relative to the receivers are determined. In step 314, the detected condor's position is assigned or categorized, e.g., by assigning it to a bin representing a distance and direction relative to the receivers. In step 316, a communication corresponding to an alert status is sent.

In step 318, the detected condor's direction and distance relative to the receivers are again determined. In step 320, the detected condor's position is assigned or categorized, e.g., by assigning it to a bin representing a distance and direction relative to the receivers. This bin may be the same bin as the previously assigned bin, or it may be another bin. In step 322, a communication corresponding to an alert status is sent. This may be the same alter as previously sent if the condor is still assigned to the same bin, or it may be another alter.

In step 324, the detected condor's trajectory is predicted based on relationship between the first position and the second position. In step 326, the detected condor's position (which can be a third position) is predicted based on the predicted trajectory. In step 328, the detected condor's position is assigned or categorized, e.g., by assigning it to a bin representing a distance and direction relative to the receivers. This bin may be the same bin as one of the previously assigned bins, or it may be another bin.

It should be noted that, in some embodiments, a method can comprise fewer or more than the steps 110-130 or the steps 310-328. In some embodiments, a method can comprise steps from the steps 110-130 and/or the steps 310-328.

Below in Table 1 is an example of an algorithm which can be used in conjunction with the systems, apparatus, and/or methods described herein.

TABLE 1

A = Antenna, SS = Signal Strength
Apply Direction classification first. Then apply distance classification

| Application sequence | Bin | RULE 1 | RULE 2 | RULE 3 | Multipoint rule | LOGIC CHECK - previous data point | LOGIC CHECK - first detection |
|---|---|---|---|---|---|---|---|
| 2 | NORTH EAST | If All 4 antennas are detected AND A1 has the highest SS. #True for 25 of 26 point If fewer than 4 antennas are detected AND A1 has the | If A1 >110 | If A2 and/or A3 = 0 | If A1 is the highest for more than 1 consecutive point | NA NA | NA NA |

TABLE 1-continued

A = Antenna, SS = Signal Strength
Apply Direction classification first. Then apply distance classification

| Application sequence | Bin | RULE 1 | RULE 2 | RULE 3 | Multipoint rule | LOGIC CHECK - previous data point | LOGIC CHECK - first detection |
|---|---|---|---|---|---|---|---|
| | | highest SS #True for 25 of 26 point | | | | | |
| 3 | SOUTH | If All 4 antennas are detected AND A3 has the highest SS. [And A4 has the lowest value] #True for 27 of 34 point If fewer than 4 antennas are detected AND A3 has the highest SS [And A4 has the lowest value] #True for 27 of 34 point | IF A3 >107 | | If A3 is the highest for more than 1 consecutive point | NA | NA |
| 4 | WEST | If All 4 antennas are detected AND A2 has the highest SS. #True for 15 of 27 point If fewer than 4 antennas are detected AND A2 has the highest SS. #True for 15 of 27 point | If A2 >123 | If A2 if not the highest then A3 will be the highest (A3 >120) #True for 11 of 27 point | If A2 is the highest for more than 1 consecutive point | NA | NA |
| NA | 8N | NA. The ridge prevents detection 5 to 8 miles to the north | NA | NA | NA | NA | NA |
| 11 | 8E | If All 4 antennas are detected AND A1 has the highest SS. #True 100% | If A1 >110 | If A2 and/or A3 = 0 | If A1 is the highest for more than 1 consecutive point | Was the previous detection also in this section or one of the 3 adjoining sections? See special logic | Bin 8E, 8S, 8W or 3N should be the first detection location for a bird. |

TABLE 1-continued

A = Antenna, SS = Signal Strength
Apply Direction classification first. Then apply distance classification

| Application sequence | Bin | RULE 1 | RULE 2 | RULE 3 | Multipoint rule | LOGIC CHECK - previous data point | LOGIC CHECK - first detection |
|---|---|---|---|---|---|---|---|
| | | If fewer than 4 antennas are detected AND A1 has the highest SS #True for 100% t | | | | for first detection | |
| 12 | 8S | If All 4 antennas are detected AND A3 has the highest SS. [And A4 has the lowest value] If fewer than 4 antennas are detected AND A3 has the highest SS [And A4 has the lowest value] | IF A3 >124 | | If A3 is the highest for more than 1 consecutive point | Was the previous detection also in this section or one of the 3 adjoining sections? See special logic for first detection | Bin 8E, 8S, 8W or 3N should be the first detection location for a bird. |
| 13 | 8W | | | | If A2 is the highest for more than 1 consecutive point | Was the previous detection also in this section or one of the 3 adjoining sections? See special logic for first detection | Bin 8E, 8S, 8W or 3N should be the first detection location for a bird. |
| NA | 5N | NA. The ridge prevents detection 3 to 5 miles to the north | NA | NA | NA | NA | NA |
| 6 | 5E | If All 4 antenna are detected AND A1 has the highest SS. If fewer than 4 antennas are detected AND A1 has the highest SS | If A1 >112 | If A2 and/or A3 = 0 | If A1 is the highest for more than 1 consecutive point | Was the previous detection also in this section or one of the 4 adjoining sections? See special logic for first detection | If this is the first detection event for this bird then location is suspect since the bird should have been detected in one of the outer rings |
| 7 | 5S | If All 4 antenna are detected AND A3 | IF A3 >120 | | If A3 is the highest for more than 1 consecutive point | Was the previous detection also in this section or | If this is the first detection event for this bird then location is |

TABLE 1-continued

A = Antenna, SS = Signal Strength
Apply Direction classification first. Then apply distance classification

| Application sequence | Bin | RULE 1 | RULE 2 | RULE 3 | Multipoint rule | LOGIC CHECK - previous data point | LOGIC CHECK - first detection |
|---|---|---|---|---|---|---|---|
| | | has the highest SS. [And A4 has the lowest value] If fewer than 4 antennas are detected AND A3 has the highest SS [And A4 has the lowest value] | | | | one of the 4 adjoining sections? See special logic for first detection | suspect since the bird should have been detected in one of the outer rings |
| 8 | 5W | If All 4 antennas are detected AND A2 has the highest SS. If fewer than 4 antennas are detected AND A2 has the highest SS. | If A2 >123 | If A2 if not the highest then A3 will be the highest (A3 >120) #True for 11 of 27 point | If A2 is the highest for more than 1 consecutive point | Was the previous detection also in this section or one of the 4 adjoining sections? See special logic for first detection | If this is the first detection event for this bird then location is suspect since the bird should have been detected in one of the outer rings |
| 1 | 3N | If the total SS for all 5 Antenna is >690 AND A4 has a value >141 then the bird is in the pass to the N (the values for all 4 antennas will be >123) #true for 4 of 5 If total SS <690 for all 5 antennas AND A4 has the highest SS then the bird is N w/in 3 miles and NOT in the pass #true for 7 of 9 If total SS <690 for all 5 antennas AND A4 | | | | Was the previous detection also in this section or one of the 6 adjoining sections? See special logic for first detection | If this is the first detection event for this bird then location MAY be correct since there is no detection in bin 8n and 5N due to the ridge |

TABLE 1-continued

A = Antenna, SS = Signal Strength
Apply Direction classification first. Then apply distance classification

| Application sequence | Bin | RULE 1 | RULE 2 | RULE 3 | Multipoint rule | LOGIC CHECK - previous data point | LOGIC CHECK - first detection |
|---|---|---|---|---|---|---|---|
| | | and A1 have SS >127 AND Ant 2 and 3 are = 0 then the bird is N w/in 3 miles and NOT in the pass #true for 2 of 9 | | | | | |
| 9 | 3E | If A 1 >0 (range 112 to 144) AND A 2 = 0 then the bird is within 3 miles to the East. #true for 8 of 8 | Frequently Ant 3 also = 0 #true for 6 of 8 | | If A1 is the highest for more than 1 consecutive point | Was the previous detection also in this section or one of the 6 adjoining sections? See special logic for first detection | If this is the first detection event for this bird then location is suspect since the bird should have been detected in one of the outer rings |
| 10 | 3S | If A 3 is not 0 AND A3 is the highest then the bird is w/in 3 miles to the S #true for 9 of 11 times when Ant 3 is not = 0 | | | If A3 is the highest for more than 1 consecutive point | Was the previous detection also in this section or one of the 6 adjoining sections? See special logic for first detection | If this is the first detection event for this bird then location is suspect since the bird should have been detected in one of the outer rings |
| 5 | 3W | If all 4 antennas have high SS (mainly 140's and 150's) then the bird is over the ReCON 1 unit (within a half mile of the unit) #True for 3 of 3 If A2 is the highest value (range 136 to 153) then the bird is within 3 miles to the W #true for 6 of 11 | | | If A2 is the highest for more than 1 consecutive point | Was the previous detection also in this section or one of the 6 adjoining sections? See special logic for first detection | If this is the first detection event for this bird then location is suspect since the bird should have been detected in one of the outer rings |

As shown above in the exemplary algorithm of Table 1, the algorithm can provide various logic checks such as "Logic Check-previous data point" and "Logic Check-first detection" to help to ensure accurate and consistent detection. For example, if one of the inner bins (e.g., Bin 5E) is the first detection bin then the location is suspect since the object (e.g., the bird) should have been detected in one of the outer rings (e.g., 8E, 8N, or 8S).

The exemplary algorithm in Table 1 above can also be adapted to various geographical areas. For example, with respect to Bin 8N, Rule 1 and Bin 5N, Rule 1, the algorithm indicates that the ridge prevents or interfere with detection 3-8 miles north. This can be accounted for by providing additional stations to ensure adequate detection and/or by factoring the geography into the algorithm. For example, with respect to the ridge, the Logic Check-first detection for Bin 3N provides a special rule to account for the possible lack of detection in Bin 8N and 5N.

Computing Systems

Figure 10:
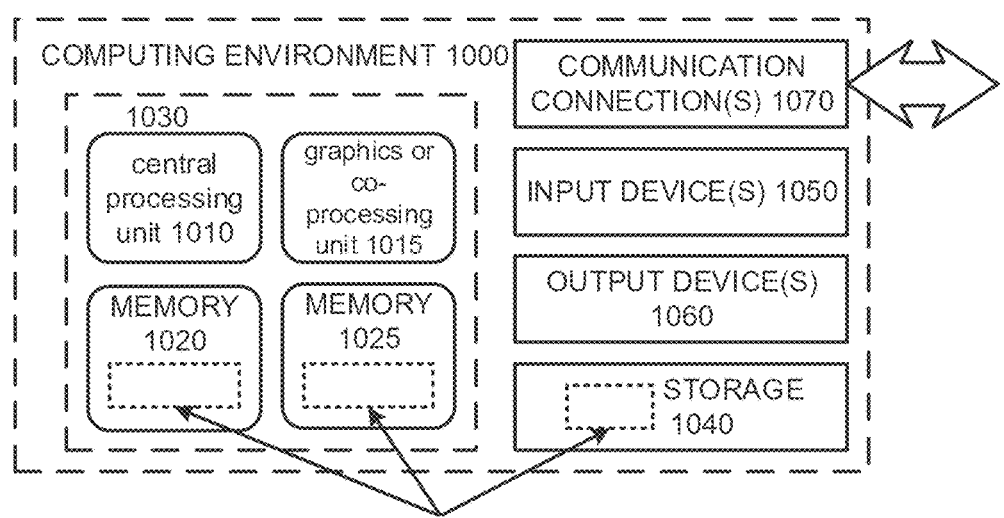
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems. For example, the computing devices 414, 514 can be configured similar to the computing system 1000.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 11:
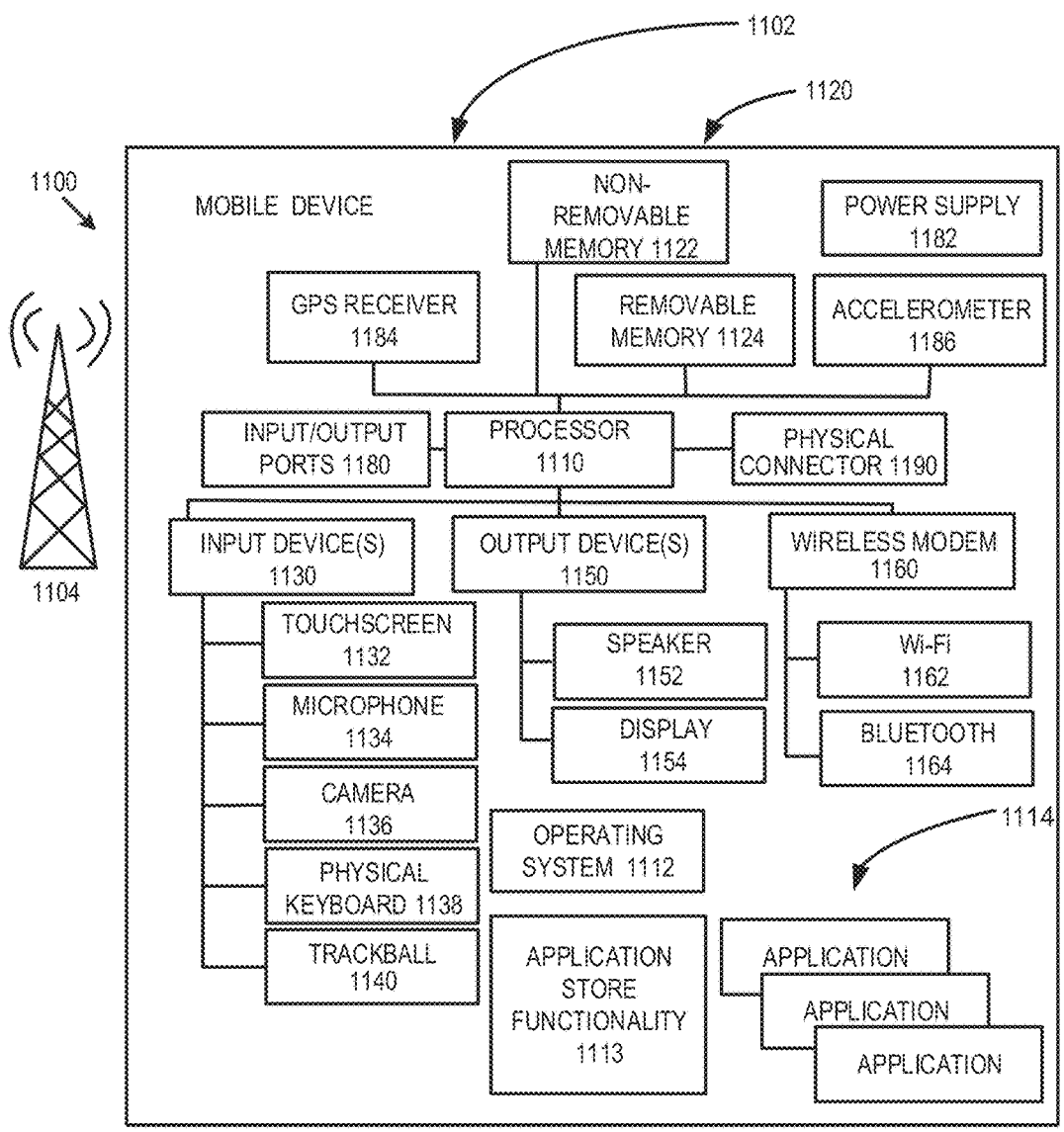
FIG. 11 is an example mobile device that can be used in conjunction with the technologies described herein.

FIG. 11 illustrates a generalized an example of a mobile device 1100 in which the described innovations may be implemented. The mobile device 1100 can include a variety of optional hardware and software components, shown generally at 1102. Any components 1102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application. Functionality 1113 for accessing an application store can also be used for acquiring and updating application programs 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Cloud-Supported Environment

FIG. 12 illustrates a generalized example of a suitable cloud-supported environment 1200 in which described embodiments, techniques, and technologies may be implemented. In the example environment 1200, various types of services (e.g., computing services) are provided by a cloud 1210. For example, the cloud 1210 can comprise a collection of computing devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computing devices (e.g., connected devices 1230, 1240, 1250) while other tasks (e.g., storage of data to be used in subsequent processing) can be performed in the cloud 1210.

In example environment 1200, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. Connected device 1240 represents a device with a mobile device screen 1245 (e.g., a small size screen). For example, connected device 1240 could be a mobile phone, smart phone, personal digital assistant, tablet computer, and the like. Connected device 1250 represents a device with a large screen 1255. For example, connected device 1250 could be a television screen (e.g., a smart television) or another device connected to a television (e.g., a set-top box or gaming console) or the like. One or more of the connected devices 1230, 1240, 1250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touchscreen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. By way of example and with reference to FIG. 11, computer-readable storage media include memory and storage 1120, 1122, and 1124. The term computer-readable storage media does not include signals and carrier waves. In addition, the term computer-readable storage media does not include communication connections (e.g., 1070, 1160, 1162, and 1164).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of controlling a wind turbine, comprising:
    detecting a condor within a detection area by receiving one or more signals emitted from a transmitter attached to the condor;
    determining a first position of the condor relative to the wind turbine by using a signal strength of a first signal of the one or more received signals;
    assigning the condor to a first predetermined zone of a plurality of predetermined zones based on the first position;
    determining a second position of the condor relative to the wind turbine by using a signal strength of a second signal of the one or more received signals;
    assigning the condor to a second predetermined zone of the plurality of predetermined zones based on the second position;
    predicting a trajectory of the condor based on a relationship between the first position and the second position; and
    altering an operation of the wind turbine based on the predicted trajectory of the condor.

2. The method of claim 1, further comprising predicting a third position of the condor based on the trajectory of the condor, and assigning the condor to a third predetermined zone of the plurality of predetermined zones based on the third position.

3. The method of claim 1, further comprising setting an alert status for each of the first and the second zones, and transmitting a communication for each of the alert statuses.

4. The method of claim 1, further comprising activating a tracking receiver configured to track the positioning of the condor based on the second predetermined zone of the plurality of predetermined zones, wherein the second predetermined zone is within an action radius.

5. The method of claim 1, wherein detecting the condor comprises scanning the area at a first interval, and the method further comprises setting a second interval, which is different than the first interval, based on the second predetermined zone of the plurality of predetermined zones.

6. The method of claim 1, wherein the wind turbine is a first wind turbine, further comprising:
at least a second wind turbine; and
continuing an operation of at least one other wind turbine based on the predicted trajectory of the condor.

7. A method of detecting position relative to operating equipment at a site, comprising:
detecting a moving object within a detection area by receiving one or more signals emitted from a transmitter attached to the object;
determining a first position of the object relative to the equipment by using a signal strength of a first signal of the one or more received signals;
assigning the object to a first predetermined zone of a plurality of predetermined zones based on the first position;
determining a second position of the object relative to the equipment by using a signal strength of a second signal of the one or more received signals;
assigning the object to a second predetermined zone of the plurality of predetermined zones based on the second position; and
predicting a trajectory of the object based on a relationship between the first position and the second position.

8. The method of claim 7, further comprising setting an alert status for each of the first and the second zones, and transmitting a communication for each of the alert statuses to an observation team and to an equipment operator.

9. The method of claim 7, wherein determining the first and second positions comprises determining direction and distance.

10. The method of claim 7, wherein the detected moving object is drone.

11. The method of claim 7, wherein the detected moving object is a condor.

12. A computer-readable storage media including instructions thereon for detecting position relative to operating equipment at a site, the computer-readable storage comprising:
instructions for detecting an object within a detection area by receiving one or more signals emitted by a transmitter attached to the object;
instructions for determining a first position of the object relative to the equipment by using a signal strength of a first signal of the one or more received signals;
instructions for assigning the object to a first predetermined zone of a plurality of predetermined zones based on the first position;
instructions for determining a second position of the object relative to the equipment by using a signal strength of a second signal of the one or more received signals;
instructions for assigning the object to a second predetermined zone of the plurality of predetermined zones based on the second position;
instructions for predicting a trajectory of the object based on a relationship between the first position and the second position; and
instructions for altering an operation of the equipment based on the predicted trajectory of the object.

13. The computer readable storage media of claim 12, further comprising instructions for predicting a third position of the object based on the trajectory of the object, and instructions for assigning the object to a third predetermined zone of the plurality of predetermined zones based on the third position.

14. The computer readable storage media of claim 12, further comprising instructions for setting an alert status for each of the first and the second zones, and instructions for transmitting a communication for each of the alert statuses.

15. The computer readable storage media of claim 12, further comprising instructions for activating a tracking receiver configured to track the positioning of the object based on the second predetermined zone of the plurality of predetermined zones, wherein the second predetermined zone is within an action radius.

16. The computer readable storage of media claim 12, wherein the instructions for detecting the object comprises instructions for scanning the area at a first interval, and further comprises instructions for setting a second interval, which is different than the first interval, based on the second predetermined zone of the plurality of predetermined zones.

17. The computer readable storage media of claim 12, wherein the equipment is a first piece of equipment in a group of equipment.

18. The computer readable storage media of claim 17, further comprising instructions for altering an operation of at least one piece of equipment based on the predicted trajectory of the object, and instructions for continuing an operation of at least one other piece of equipment based on the predicted trajectory of the object.

19. A system for detecting position relative to operating equipment at a site, comprising:
at least one receiver configured for receiving signals from a transmitter attached to an object;
at least one communication link configured to transmit and receive communications between the at least one receiver to a remote location; and
the system including one or more processors configured to perform the following instructions:
instructions for detecting the object within a detection area, wherein the detecting the object within a detection area comprises receiving one or more signals emitted from the transmitter on the object;
instructions for determining a first position of the object relative to the equipment by using a signal strength of a first signal of the one or more received signals;
instructions for determining a second position of the object relative to the equipment by using a signal strength of a second signal of the one or more received signals; and
instructions for predicting a trajectory of the object based on a relationship between the first position and the second position.

20. The system of claim 19, wherein the one or more processors are further configured to perform instructions for assigning the object to a first predetermined zone of a plurality of predetermined zones based on the first position, and instructions for assigning the object to a second predetermined zone of the plurality of predetermined zones based on the second position.

21. The system of claim 19, further comprising an additional receiver configured for tracking the positioning of the object.

22. The system of claim 21, wherein the additional receiver is a fourth receiver.

23. The system of claim 19, wherein the object is a first object in a group of objects, the at least one receiver is configured for receiving signals from more than one of the objects, and the one or more processors are configured to perform the instructions for each object in the group of objects.

24. The system of claim 19, further comprising a reference beacon.

25. The system of claim 19, wherein the equipment is a wind turbine, and the moving object is a condor.

26. The system of claim 19, wherein the moving object is a drone.

27. The method of claim 1, wherein the determining a first position of the condor relative to the wind turbine comprises determining a first distance and a first direction, and wherein the determining a second position of the condor relative to the wind turbine comprises determining a second distance and a second direction.

28. The computer-readable storage media of claim 12, wherein the instructions for determining the first position of the object relative to the equipment comprise determining a first distance and a first direction, and wherein the instructions for determining the second position of the object relative to the equipment comprise determining a second distance and a second direction.

29. The system of claim 19, wherein the instructions for determining the first position of the object relative to the equipment comprises determining a first distance and a first direction, and wherein the instructions for determining the second position of the object relative to the equipment comprise determining a second distance and a second direction.

\* \* \* \* \*